United States Patent [19]

Jung

[11] Patent Number: 4,632,887
[45] Date of Patent: Dec. 30, 1986

[54] GALVANIC PRIMARY CELL

[75] Inventor: Gerd Jung, Ellwangen, Fed. Rep. of Germany

[73] Assignee: Varta Batterie Aktiengesellschaft, Hanover, Fed. Rep. of Germany

[21] Appl. No.: 750,008

[22] Filed: Jun. 27, 1985

[30] Foreign Application Priority Data

Jul. 9, 1984 [DE]  Fed. Rep. of Germany ....... 3425170

[51] Int. Cl.⁴ ............................................ H01M 2/02
[52] U.S. Cl. .................................... 429/181; 429/171; 429/172; 429/173
[58] Field of Search .............................. 429/171–173, 429/181

[56] References Cited

U.S. PATENT DOCUMENTS 2,060,799 11/1936 Drummond ......................... 429/172
2,103,714 12/1937 Drummond ......................... 429/172
2,169,702  8/1939 Marsal ................................ 429/173
3,506,495  4/1970 Reilly et al. .................... 429/171 X
3,919,371 11/1975 Jache ............................... 429/184 X Primary Examiner—Brian E. Hearn
Assistant Examiner—Stephen J. Kalafut
Attorney, Agent, or Firm—Weiser & Stapler

[57] ABSTRACT

A primary element of the round-cell type is effectively protected from desiccation by a sealing washer made of a flexible foamed plastic (preferably foamed PVC), placed above the depolarization electrode and clamped between the positive cap and the zinc can of the cell. An additional adhesive beading is provided on the carbon rod of the cell to prevent the passage of electrolyte through the central opening in the sealing washer which receives the carbon rod.

14 Claims, 6 Drawing Figures

GALVANIC PRIMARY CELL

BACKGROUND OF THE INVENTION

The present invention generally concerns a galvanic primary cell having a cylindrical metal casing as the negative electrode, a depolarization electrode arranged concentrically around a carbon conductor rod, a separator between the electrodes, and an electrolyte.

Numerous dry cells of this general design are known. In the predominant round-cell type, the negative electrode takes the form of a metal casing, preferably made of zinc, which also serves as the cell housing. In conventional cell designs, this metal casing is then wrapped in a cardboard sleeve, or is simply provided with a label. In leakproof cell designs, the metal casing (together with its contents) is slipped into a sheet-metal covering, with an insulating sleeve placed between these two structures.

Regarding the top of the resulting housing, many designs have been proposed which are particularly directed to preventing desiccation of the cell during storage. Wax, bitumen, or similar substances are often used for sealing purposes. In German Pat. No. 1,114,868, the efficiency of a plastic sealing substance made of bitumen is increased by means of an impervious washer made of wax-impregnated cardboard which is placed between the sealing substance and the cover of the cell.

These and other such arrangements have the disadvantage that they require either considerably expensive production and/or peripheral equipment (heated casings and conductors, metering pumps, cooling lines, etc.) or high uniformity in the prefabricated insert pieces which are used. Moreover, such components must often occupy a considerable volume, thus taking up space at the expense of the active cell components. Lastly, sealing systems of this type often undergo changes over long periods of storage, leading to a deterioration in storage quality, and therefore serviceability, which can be prevented only by employing very costly supplementary measures.

SUMMARY OF THE INVENTION

It is therefore a primary object of the present invention to provide a space-saving seal design which is inexpensive to manufacture and which can be used in presently existing round-cell constructions, including both conventional and leakproof designs.

These and other objects are achieved in accordance with the present invention by providing a galvanic primary element of the type discussed above with a sealing washer made of a flexible, foamed plastic and having a centrally disposed opening, and which is capable of being placed in the space defined above the depolarization electrode of the cell so as to bridge the gap between the carbon rod and the metal casing of the cell. In so doing, the carbon rod is caused to extend in sealed fashion through the central opening of the washer, and the rim of the cell cap or cover is caused to rest on the rim of the upper surface of the sealing washer as the sealing washer is clamped between the rim of the cap and the metal casing.

In accordance with the present invention, the foamed plastics which are used to form the sealing washer preferably belong to the group of the so-called flexible foamed materials with closed-cell structures. The fundamental materials are, among others, polyethylene, polystyrene, polyether, polyester or polyurethane, but preferably polyvinyl chloride. By adjusting the thickness and porosity of the washer, a particular permeability as well as a desired degree of elasticity can be obtained. The thickness of the washer is preferably between 0.5 and 3.0 mm. Since such foamed plastics are marketed in the form of discs or strips, the sealing washers according to the present invention can be formed directly on the production line, or punched from a strip and thereafter positioned on the rim of the zinc can.

For final assembly, primarily in connection with cell designs wherein the zinc can remains bare and is simply covered with a label, the elastic washer is pushed between the rim of the cap and the zinc can when the positive cap is pressed onto the zinc can by means of a die or the like. In such case, the specific properties of the foamed plastic are seen to be particularly advantageous, and superior to those of other, more conventional plastics. These properties include slight compressibility, which makes it possible to form thicker sealing washers which are more easily handled by machines without bending or tearing, as well as permanent residual elasticity, which inhibits yielding of the material to continued pressure as a result of cold flow. In order to increase the reliability of the seal, the zinc can is preferably crimped slightly inwardly, depending on the shape of the cap, to clamp the sealing washer between the rim of the cap and the rim of the zinc can.

As a further possibility for final assembly, primarily in connection with sheathed cell designs, the positive cap is used to press the washer onto a previously crimped or flanged zinc can and the sheet-metal casing is then flanged, after first insulating the zinc can from the sheet-metal casing with a cardboard sleeve or heat-shrink tube. In this case, the sealing washer rests directly on the flanged rim of the zinc can and, together with the cap, is clamped between the rim of the zinc can and the rim of the sheet-metal casing.

The finished cell need contain no further disc-shaped sealing element other than the sealing washer according to the present invention, and a cover disc which rests on the positive electrode rod, and need contain no wax or bitumen. However, to prevent electrolyte from reaching the cap along the surface of the carbon rod which extends through the opening in the sealing washer, the present invention provides for placing a bead made of a plastic sealing substance on the carbon rod at the point where the rod passes through the washer, thus sealing and adhering the washer to the rod. Suitable materials for forming such a bead include wax, bitumen or other substances which are soluble in organic solvents such as the polyisobutyls, which form a residue of rubbery consistency after the solvent has evaporated.

BRIEF DESCRIPTION OF THE DRAWINGS

In the several views provided, like reference numerals denote similar structure.

DETAILED DESCRIPTION OF PREFERRED EMBODIMENTS

Figure 1:
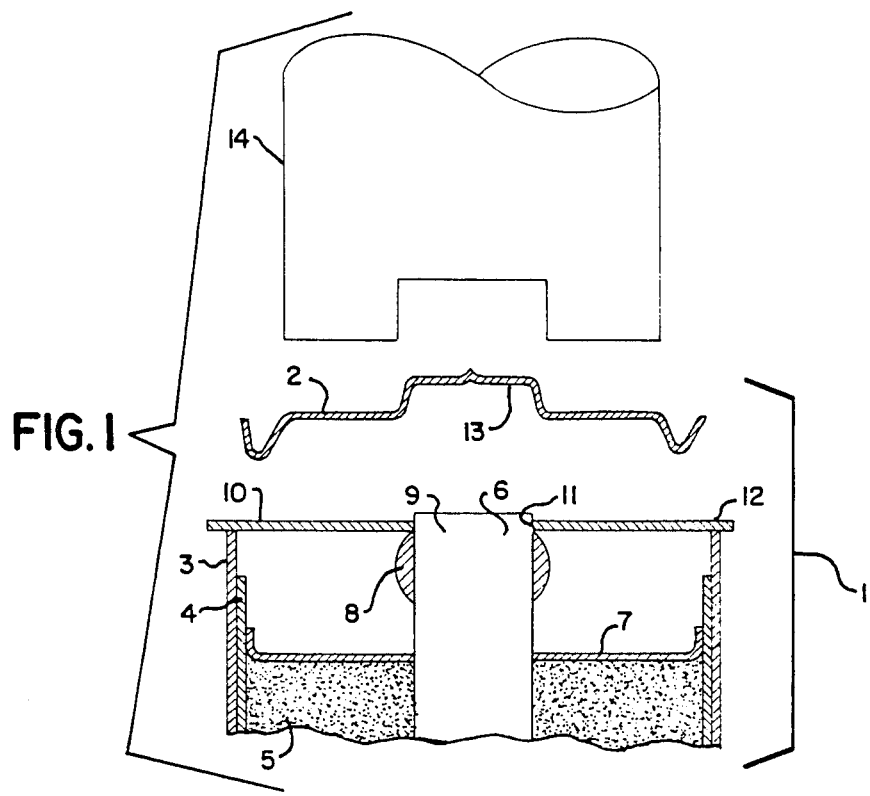
FIG. 1 is an exploded, partial cross-sectional view of a primary cell in accordance with the present invention.

Although specific forms of the invention have been selected for illustration in the drawings, and the following description is drawn in specific terms for the purpose of describing these forms of the invention, this description is not intended to limit the scope of the invention which is defined in the appended claims.

FIG. 1 shows the various components of a cell 1 assembled in accordance with the present invention as previously described. To this end, a cell cap 2 which is to form the positive electrode of the cell, and a metal casing 3 (generally zinc) which is to form the negative electrode, combine to enclose the operative cell. Concentrically disposed within the casing 3 are a separator 4, which is generally coated with an electrolyte paste, a suitable depolarization substance 5, and a carbon rod 6. A disc 7 extends between the separator 4 and the carbon rod 6 so as to confine the depolarization substance 5 within the casing 3.

Figure 2:
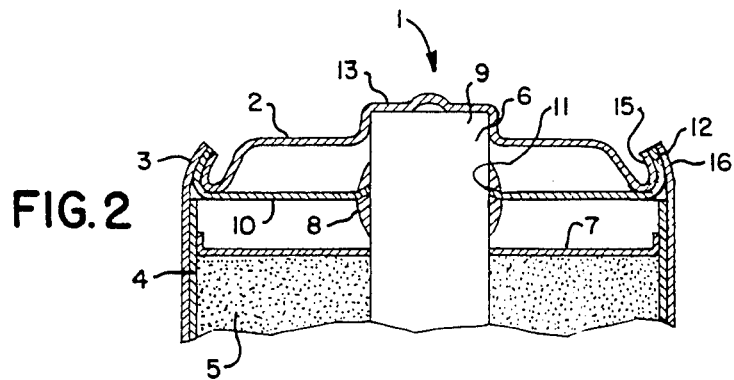

In assembling the cell, as shown in FIG. 2, an adhesive sealing substance 8 is applied to the end 9 of the carbon rod 6, and a sealing washer 10 is positioned over the open end of the casing 3 such that the center opening 11 of the washer 10 passes over the end 9 of the carbon rod 6, and so that the rim 12 of the sealing washer 10 overlies the perimeter of the casing 3. The sealing cap 2 is then concentrically positioned over the casing 3 as shown, such that the centrally disposed recess 13 of the cap 2 overlies the end 9 of the carbon rod 6, and is pressed into position by means of an appropriate die 14. In so doing, the centrally disposed recess 13 of the cap 2 is brought into contact with the end 9 of the carbon rod 6, and the sealing washer 10 is drawn into position so that the rim 12 of the washer 10 is retained between the rim 15 of the cap 2 and the rim 16 of the casing 3 and so that the center opening 11 of the washer 10 is retained within the sealing substance 8. The cell 1 is then advantageously covered with cardboard or a paper label, as desired, to develop a conventional primary cell.

Figure 3:
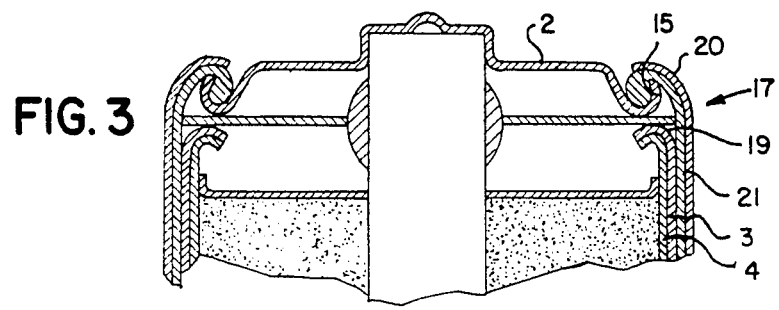
Figure 4:
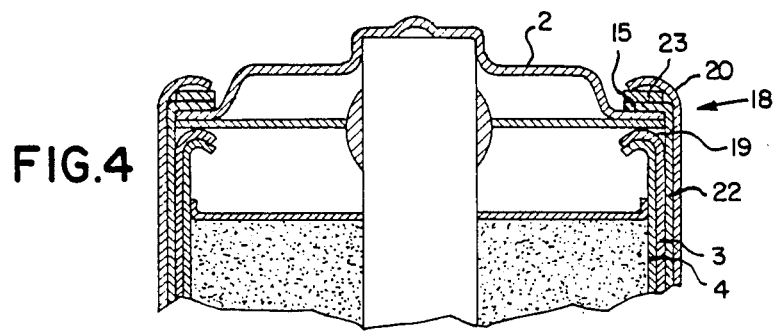

FIGS. 3 and 4 show leakproof-type cells 17, 18 sealed according to the present invention. In such case, the zinc can 3 is provided with a separate, inwardly directed flange 19, and the sealing washer 10 is caused to rest on the flange 19, as shown. A sheet-metal casing 20 encloses the casing 3 and the cap 2 by engaging the rim 15 of the cap 2 as shown. An insulating layer is provided between the casing 3 and the casing 20. In FIG. 3, this insulating layer is a paper sleeve 21. In FIG. 4, this insulating layer is a heat-shrink sleeve 22. In order to prevent perforation of the insulating layer during flanging of the sheet-metal casing 20, which would produce a short-circuit between the casing 20 and the positive conductor, a plastic ring 23 is advantageously installed at this interface. FIG. 4 shows an example of such an interface in connection with a cell construction which incorporates a heat-shrink sleeve 22 as the insulating material.

Figure 5:
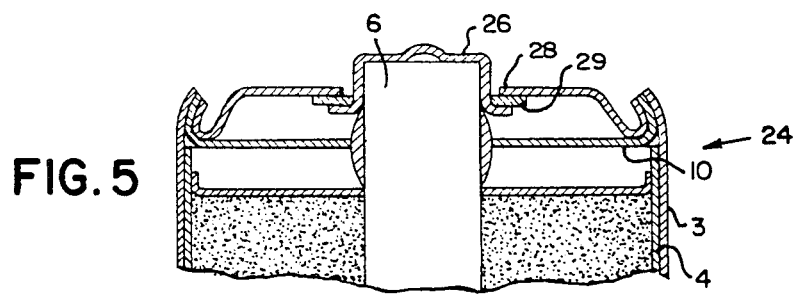
FIGS. 2 to 6 are partial cross-sectional views of various alternative embodiment primary cell constructions in accordance with the present invention.
Figure 6:
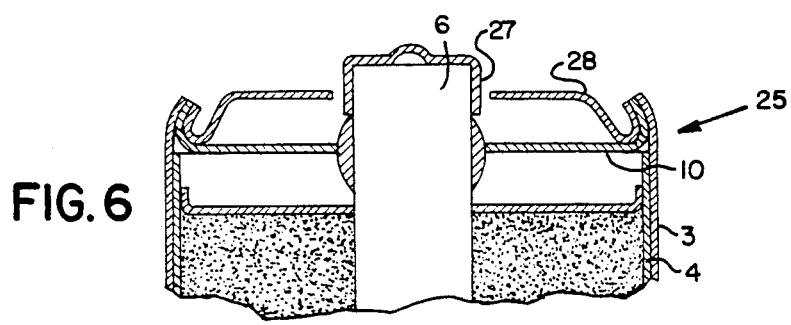

The cells 24, 25 shown in FIGS. 5 and 6 differ from the construction shown in FIG. 2 in their two-part cell covering, in which the positive cap 2 is replaced with a two-part construction including a flanged cap 26 (FIG. 5), or even a simple rod cap 27 (FIG. 6) which only covers the top of the carbon rod 6, and a special cover cap 28 which covers the remainder of the cell. In FIG. 5, an insulation ring 29 is interposed between the flanged cap 26 and the cover cap 28, sealing the resulting assembly. However, as shown in FIG. 6, an "open" covering is also possible since, in this case, a link between the rod cap 27 and the cover cap 28 is lacking. It is to be understood that the two-part cap construction illustrated in FIGS. 5 and 6 may be used in connection with the sheathed cells shown in FIGS. 3 and 4, if desired.

The permanent elastic qualities of the sealing washer 10 make it possible to circumvent the well-known cold-flow characteristics of molded plastic parts. In addition, any unevenness of the surfaces to be sealed is compensated for by the high elasticity of the washer material according to the present invention. The permanent elasticity of the washer material also allows for a certain degree of valving action in the embodiments shown in FIGS. 3 and 4. Thus, the particular advantages of the present sealing method lie in its very simplicity in comparison to those previously available covering processes which made use of a perforated cardboard washer, and in that prefabricated perforated washers made of the material according to the present invention are capable of being put in place and pressed on at very high speed.

Storage tests of cells according to the present invention in comparison to cells using conventional bitumen seals show that cells according to the present invention, after storage at 45° C. for three months, were comparable to fresh cells in terms of voltage performance in a discharge test, while the conventional cells performed considerably more poorly.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. For use in a galvanic primary cell having a cylindrical metal casing as the negative electrode, a positive depolarization electrode placed concentrically around a carbon conductor rod, a separator positioned between the metal casing and the depolarization electrode, and an electrolyte, an improved sealing means comprising:
   a sealing washer having a central opening and made of a flexible, foamed plastic material, and placed in a space above the depolarization electrode and between the carbon rod and the metal casing such that the carbon rod extends in sealed fashion through the central opening of the washer; and
   a positive cap, the rim of which rests on the periphery of the sealing washer so that the sealing washer is clamped between the rim of the cap and the metal casing.

2. The sealing means of claim 1 wherein a plastic sealing substance is placed on the carbon rod at the point where the rod passes through the sealing washer.

3. The sealing means of claim 1 wherein the foamed plastic forming the sealing washer is a flexible foamed material with a closed-cell structure.

4. The sealing means of claim 3 wherein the foamed plastic is polyvinyl chloride.

5. The sealing means of claim 1 wherein the thickness of the sealing washer is from 0.5 to 3.0 mm.

6. The sealing means of claim 1 wherein the sealing washer is clamped by constricting the metal casing inwardly between the rim of the cap and the rim of the metal casing.

7. The sealing means of claim 1 wherein the metal casing has a flanged rim, the metal casing is covered by a sheet-metal sheathing, the sealing washer rests on the flanged rim of the metal casing, and flanging of the sheet-metal covering clamps the sealing washer between the flange of the metal casing and the rim of the cap.

8. The sealing means of claim 7 wherein a sealing ring is positioned between the rim of the cap and the flange of the metal casing.

9. The sealing means of claim 1 wherein the cap is a one-piece construction.

10. The sealing means of claim 1 wherein the cap comprises two portions, a first portion which overlies the carbon rod and a second portion which overlies the depolarization electrode.

11. The sealing means of claim 10 wherein an insulating ring is positioned between a flange in the first portion of the cap and the inner rim of the second portion of the cap.

12. The sealing means of claim 10 wherein a gap is developed between the first and second portions of the cap.

13. The sealing means of claim 1 wherein the sealing washer bridges the gap between the carbon rod and the metal casing.

14. For use in a galvanic primary cell having a cylindrical metal casing as the negative electrode, a positive depolarization electrode placed concentrically around a carbon conductor rod, a separator positioned between the metal casing and the depolarization electrode, and an electrolyte, a space saving sealing means consisting essentially of:

a sealing washer having a central opening and made of a flexible, foamed plastic material, and placed in a space above the depolarization electrode and between the carbon rod and the metal casing such that the carbon rod extends in sealed fashion through the central opening of the washer; and a positive cap, the rim of which rests on the periphery of the sealing washer so that the sealing washer is clamped between the rim of the cap and the metal casing.

* * * * *